(No Model.)
J. Q. ADAMS.
NUT LOCK.
No. 277,866. Patented May 22, 1883.
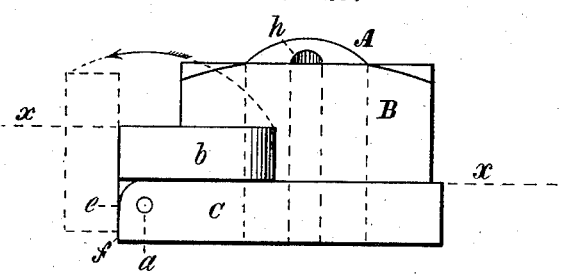
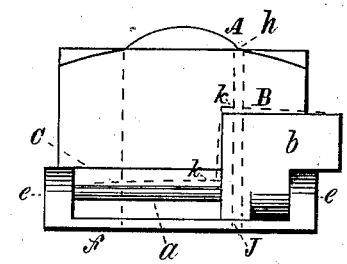
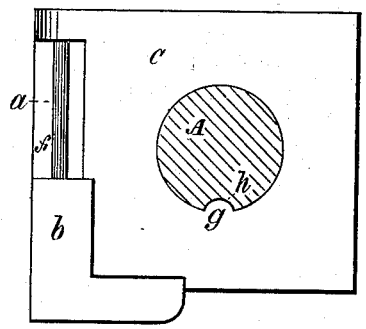
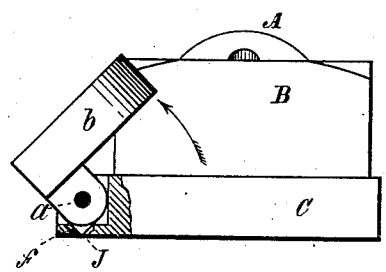
WITNESSES.
A. W. Newton.
R. Newton.
INVENTOR.
John Q. Adams.
By F. S. Davenport, Atty.

UNITED STATES PATENT OFFICE.

JOHN Q. ADAMS, OF KANE, ILLINOIS.

NUT-LOCK.

SPECIFICATION forming part of Letters Patent No. 277,866, dated May 22, 1883.

Application filed October 6, 1882. (No model.)

*To all whom it may concern:*

Be it known that I, JOHN Q. ADAMS, of Kane, in the county of Greene and State of Illinois, have invented a new and Improved Nut-Lock; and I do hereby declare that the following is a full and exact description of the same, reference being had to the accompanying drawings, and to the letters of reference marked thereon.

My invention relates to an improvement in nut-locks; and the object of my improvement is to combine in a compact and simple device the maximum of security with the minimum of cost.

With this end in view my invention consists in certain details of construction and combinations of parts, fully described and explained hereinafter.

In the accompanying drawings, Figure 1 is a side view of the device, showing the position of the nut-clip when the nut is locked, the position when the nut is unlocked being shown in dotted lines. Fig. 2 is a rear view of the device, showing the nut-clip turned down, so as to lock the nut. Fig. 3 is a plan view of the device, taken in the line *x x*, Fig. 1. Fig. 4 is a side view, similar to Fig. 1, but showing the nut-clip in the act of being turned back.

In the drawings, A represents the bolt, B the nut, and C a square washer, to one side of which is hinged upon a flexible rod or wire, *a*, preferably of steel, a nut-clip, *b*, adapted, when turned down, as shown in Fig. 1, to embrace two adjacent sides of the nut B. Extending rearward from the washer C and forming a part thereof are two projections, *e e*, joined together at their lower edges by a thin web of metal, *f*, which, with the projections referred to, form a cavity, in which is hinged, in the manner shown in the drawings, the nut-clip *b*.

In Fig. 3, which is a plan view of the device, taken in the line *x x*, Fig. 1, it will be observed that in order to prevent the washer turning about the bolt the latter is provided with a longitudinal groove, *h*, in which plays freely, in the direction of the bolt's length, a tooth, *g*, projecting inwardly from the internal edge of the washer. Matters being thus, it will be readily seen that the washer is rendered immovable in angular position about the bolt, and consequently the nut-clip, being hinged to the washer, is also immovable about the bolt. It therefore follows that when the nut-clip is turned down into the position shown in Fig. 1—that is, into such position that it includes two adjacent sides of the nut—the latter is effectually and securely locked; but it is also necessary to secure the nut-clip against the possibility of being accidentally turned back by a slight blow or any jarring motion to which the locking mechanism might be unavoidably subjected. This I accomplish by making the inner lower part of the nut-clip square, as shown at J, Fig. 2, so as to form an angle adapted to impinge upon the web *f* as the nut-clip is turned back into the position shown in dotted lines in Fig. 1. It will now be observed that to allow the angle J to sweep round through the required arc either the web *f*, upon which it impinges, must yield downward or the hinge-wire *a* must spring upward. This will be readily understood by reference to Fig. 4, in which is shown the position the angle J would occupy if the yielding of the hinge rod or wire *a* were not provided for, so as to allow the nut-clip to rise into the position shown in dotted lines at *k k*, Fig. 2, and thus admit of the nut-clip turning upon its axis through an arc of a quarter of a circle. By the interaction of these parts, which are adapted to yield to the strength of an ordinary hand, the nut-clip is securely retained, either in the locked or unlocked position, and may be changed from one position to the other without any violent effort on the part of the operator.

Having fully described my invention, what I claim as new, and desire to secure by Letters Patent, is—

In a nut-lock, the nut-clip *b*, adapted to embrace two adjacent sides of the nut, and provided with an angular projection, J, in combination, with a washer, C, secured in angular position about the bolt A by a tooth, *g*, adapted to engage with a groove, *h*, in the side of the bolt, said washer being provided with a web, *f*, upon which impinges the projection J as the nut-clip is turned upon its axis, the said nut-clip and washer being hinged together by a spring rod or wire, *a*, all the above parts constructed and combined for united operation substantially in the manner and for the purpose herein set forth.

This specification signed and witnessed this 19th day of September, 1882.

JOHN Q. ADAMS.

Witnesses:
H. D. STELLE,
R. NEWTON.